US011346956B2

(12) United States Patent
Marchetti et al.

(10) Patent No.: US 11,346,956 B2
(45) Date of Patent: May 31, 2022

(54) REFUSE CONTAINER TRACKING SYSTEMS AND METHODS

(71) Applicant: Wastequip LLC, Charlotte, NC (US)

(72) Inventors: Michael Marchetti, Charlotte, NC (US); J. Cody Collins, Charlotte, NC (US); Martin Damon Bryant, Mint Hill, NC (US)

(73) Assignee: Wastequip LLC, Charlotte, NC (US)

( * ) Notice: Subject to any disclaimer, the term of this patent is extended or adjusted under 35 U.S.C. 154(b) by 0 days.

(21) Appl. No.: 17/078,153

(22) Filed: Oct. 23, 2020

(65) Prior Publication Data

US 2021/0124056 A1 Apr. 29, 2021

Related U.S. Application Data

(60) Provisional application No. 62/925,911, filed on Oct. 25, 2019.

(51) Int. Cl.
*G01S 19/06* (2010.01)
*H04W 4/029* (2018.01)
(Continued)

(52) U.S. Cl.
CPC ............ *G01S 19/06* (2013.01); *G06F 9/4418* (2013.01); *G06Q 10/30* (2013.01); *H04W 4/029* (2018.02)

(58) Field of Classification Search
CPC .......... G01S 19/06; G01S 19/07; G01S 19/25; G01S 19/252; G01S 19/26; G01S 19/31; G01S 19/34; G01S 19/42; G06Q 10/00; G06Q 10/30; G06Q 20/4015; G06F 1/32; G06F 1/3203; G06F 1/3206; G06F 1/3234; G06F 1/3243; G06F 1/3293; G06F 1/3246; G06F 21/81; G06F 9/4401; G06F 9/4418; G06F 1/329; H04W 4/029; H04W 4/02; H04W 4/38; H04W 4/40; H04W 4/44; H04W 4/46; H04W 4/48; H04W 4/70;
(Continued)

(56) References Cited

U.S. PATENT DOCUMENTS

7,670,224 B2 * 3/2010 Williams
8,146,798 B2 4/2012 Flood et al.
(Continued)

*Primary Examiner* — Meless N Zewdu
(74) *Attorney, Agent, or Firm* — Nelson Mullins Riley & Scarborough LLP (57) ABSTRACT

Container tracking systems and related methods. A container tracking assembly comprises a processor having a powered-off state and a sleep state, at least one sensor, a radio frequency transceiver, and a power source in electrical communication with the processor, the at least one sensor, and the radio frequency transceiver. Additionally, the container tracking assembly comprises a non-transitory memory having instructions stored thereon, wherein the instructions, when executed by the processor, are operative to acquire, via the radio frequency transceiver, a current location of the container and cause the processor to enter the powered-off state if the current location of the container does not differ from a previously-acquired location of the container by more than a threshold amount. If the current location of the container differs from the previously-acquired location of the container by more than the threshold amount, the processor enters the sleep state for a first period of time.

22 Claims, 8 Drawing Sheets

(51) Int. Cl.
*G06F 9/4401* (2018.01)
*G06Q 10/00* (2012.01)

(58) Field of Classification Search
CPC ........ H04W 4/80; H04W 52/00; H04L 67/12; H04L 12/1831; Y02W 90/00; Y02W 90/10
See application file for complete search history.

(56) References Cited

U.S. PATENT DOCUMENTS

| | | |
|---|---|---|
| 8,714,440 B2 | 5/2014 | Flood et al. |
| 9,055,475 B2* | 6/2015 | Lacatus et al. ....... H04W 24/08 |
| 9,546,040 B2 | 1/2017 | Flood et al. |
| 9,671,224 B2* | 6/2017 | Karvounis et al. ...... G01C 5/00 |
| 9,754,382 B1 | 9/2017 | Rodoni |
| 10,210,623 B2 | 2/2019 | Rodoni |
| 10,798,522 B1 | 10/2020 | Benjamin et al. |
| 2008/0218351 A1* | 9/2008 | Corrdo et al. ............. 340/572.4 |
| 2010/0271260 A1* | 10/2010 | Guo .................... 342/357.74 |
| 2014/0278630 A1 | 9/2014 | Gates et al. |
| 2014/0379588 A1 | 12/2014 | Gates et al. |
| 2017/0121107 A1 | 5/2017 | Flood et al. |
| 2018/0158020 A1* | 6/2018 | Khasis ............... G06Q 10/0833 463/24 |
| 2019/0120929 A1* | 4/2019 | Meadow .................. G01S 5/10 |
| 2019/0197498 A1 | 6/2019 | Gates et al. |
| 2020/0013024 A1 | 1/2020 | Armstrong et al. |
| 2020/0193620 A1 | 6/2020 | Armstrong et al. |
| 2020/0256109 A1* | 8/2020 | Bean et al. ........... E05F 15/605 |
| 2021/0112497 A1* | 4/2021 | Singh et al. ...... H04W 52/0251 |
| 2021/0192445 A1* | 6/2021 | Vutukuri et al. .. G06Q 10/0833 |

* cited by examiner

REFUSE CONTAINER TRACKING SYSTEMS AND METHODS

PRIORITY CLAIM

This application claims the benefit under 35 U.S.C. § 119(e) of U.S. Provisional Application Ser. No. 62/925,911, entitled "Refuse Container Tracking Systems and Methods," filed on Oct. 25, 2019, the entire disclosure of which is relied upon and incorporated by reference herein for all purposes.

TECHNICAL FIELD

Embodiments of the present invention generally relate to the field of material-hauling containers, including various types of refuse containers. More particularly, certain embodiments of the present invention relate to improved systems and methods for tracking the location and movement of refuse containers. In certain embodiments, for example, the system may default to an inactive (e.g., low-power and/or a powered-off) state, and the frequency with which system components enter an active (e.g., fully powered) state may depend on whether the container is moving, the rate of such movement, and/or other factors.

BACKGROUND

In the waste and materials hauling industry, a variety of containers are used to collect, transport, and/or dump waste, bulk, and liquid materials, among others. Such containers typically are carried on vehicles, such as trucks, or on trailers. The vehicle or trailer is provided with a hoist apparatus to load a container onto and unload the container from the vehicle or trailer, transport the container, and empty the container. Examples of hoist apparatuses include hook hoists, cable hoists, winches, forklifts, and container handlers.

One type of refuse container is known as a "roll-off container." Roll-off containers can be used in a variety of demanding waste applications, including scrap collection, construction and remodeling, demolition, and industrial clean-up, among others. Roll-off containers are usually designated by the volume of material they can contain, such as 20, 30, or 40 cubic yards. Other refuse containers used in similar applications include "front-end load" ("FEL"), "rear-end load," and intermodal containers.

Further, various containers are used for the storage, collection, and transport of household garbage and recyclable materials. For example, such containers include wheeled "roll out" containers that customers, such as residences and businesses, use to store such refuse. Municipalities and/or private companies may collect such refuse from customers on a periodic basis, as is well understood.

SUMMARY

Systems for remotely monitoring the locations of refuse containers, for example for theft deterrence and inventory management, are known. Such systems, which may be attached to a refuse container, may employ wireless communications technology to determine the container's location and to facilitate communication of the container's location to a remote location. However, there are a number of drawbacks with such systems. Among other things, such systems are "always on," in that they may continuously provide information regarding the location of a container, and they are not ever fully powered down. As a result, the system's battery lasts a much shorter time than is desirable. Further, such devices cannot themselves ascertain whether a tracked container is moving or is stationary, but rather they must rely on external systems to make that determination.

In contrast, some example embodiments of the present invention comprise a container tracking assembly that may remain in a low-power and/or powered-off state until one or more sensor(s) and/or timer(s) are actuated. The container tracking assembly may be coupled with or otherwise provided on or in a refuse container to track the location and movement thereof, and in some embodiments, movement or tilting of the container, or some other change in container location or orientation, may cause the sensor(s) to be actuated. In response, other components of the container tracking assembly may "wake up" from an inactive and/or powered-off state.

In some embodiments, once components of the assembly are in an active state, the container tracking assembly may determine its location, for example via a satellite navigation transceiver and/or a terrestrial transceiver, and associate the location information with a time or timestamp. This information may be stored in memory. In various embodiments, this information may also be sent to a remote system via suitable wireless communications electronics. This information may be compared, either via the container tracking assembly itself, at the remote system, or both, to information previously stored in memory, either locally or remotely. Based on this comparison, it may be determined whether the container has changed location and, if so, its rate of speed, among other information.

In various embodiments, after each such location determination and comparison, electronic components of the container tracking assembly may be placed into a low-power state for a period of time. In various embodiments, the period of time may vary depending, for example, on whether the container is changing location and, if applicable, the rate of speed at which the container is changing location. For instance, if the container is determined to be moving at a slow rate of speed, the period of time may be set to be longer, allowing the assembly to conserve power, whereas if the container is moving at a higher rate of speed, the period of time may be set to be shorter, such that more frequent data regarding movement or location may be obtained. In this regard, if a container is moving relatively slowly, a lower sample rate may be needed to convey the same information as could be conveyed using a static, or more frequent, sample rate, with sample rate being controlled by a sleep timer. A variable sample rate may facilitate a balance between data granularity and power conservation. Thus, in various embodiments, the sample rate of location tracking necessary or desired to convey a good picture of where the container has been may be used to define the sleep time, and thus the frequency with which location information is acquired and/or transferred.

In some embodiments, after the period of time has ended, components of the container tracking assembly may again become active, and the cycle may repeat. In some embodiments, these cycles will repeat until the variation in the location of the container falls below a threshold amount or does not change, at which point the container tracking assembly may enter a fully powered-off state for an indefinite period of time. The container tracking assembly may then only reenter an active state upon actuation of one or more sensors.

In accordance with another embodiment, a container tracking assembly for attachment to a container in order to track the location thereof comprises a processor, the processor having a powered-off state and a sleep state, at least one sensor in electronic communication with the processor, a radio frequency transceiver in electronic communication with the processor, and a power source in electrical communication with the processor, the at least one sensor, and the radio frequency transceiver. Additionally, the container tracking assembly comprises a non-transitory memory having instructions stored thereon, wherein the instructions, when executed by the processor, are operative to acquire, via the radio frequency transceiver, a current location of the container and cause the processor to enter the powered-off state if the current location of the container does not differ from a previously-acquired location of the container by more than a threshold amount. Also, if the current location of the container differs from the previously-acquired location of the container by more than the threshold amount, the instructions, when executed by the processor, are operative to cause the processor to enter the sleep state for a first period of time.

In accordance with yet another embodiment, a method of remotely tracking movement of a container comprises providing a container tracking assembly, the container tracking assembly comprising a processor, a satellite navigation receiver in electronic communication with the processor, at least one sensor, and a power source in electrical communication with the processor, satellite navigation receiver, and the at least one sensor. The method also comprises coupling the container tracking assembly with the container and detecting movement of the container via the at least one sensor, wherein in response to the detecting of movement, the processor enters a powered-on state from a powered-off state. Further, the method comprises acquiring information representative of the location of the container via the satellite navigation receiver, determining whether the location of the container is changing, and if the location of the container is changing, causing the processor to sleep for a first amount of time. If the location of the container has not changed, the method comprises causing the processor to enter the powered-off state.

In accordance with another embodiment, a method of remotely tracking movement of a container comprises providing container tracking electronics, the container tracking electronics including a processor in electronic communication with a satellite navigation receiver. The method also comprises coupling the container tracking electronics with the container, acquiring information representative of the location of the container via the container tracking electronics, and determining whether the location of the container is changing and, if so, a rate of such change. If the location of the container is changing, the method comprises calculating a sleep time and causing the processor to sleep for the sleep time, wherein the sleep time is based on the rate of such change. If the location of the container has not changed, the method comprises causing the container tracking electronics to enter a powered-off state.

As set forth herein, various embodiments of the present invention may conserve the life of a battery or other power source of the container tracking assembly, and the power source may last much longer than in prior art devices. Further, in various embodiments, changes in the location, movement, and/or orientation of a container may be more accurately measured and tracked. Aspects of these and other embodiments are described in greater detail below.

BRIEF DESCRIPTION OF THE DRAWINGS

Having thus described some example embodiments in general terms, reference will now be made to the accompanying drawings, which are not necessarily drawn to scale, and wherein:

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, the term "powered-off," in the context of an electrical or electronic component, refers to a state in which the component is not consuming electrical power from a power source. In some embodiments, elements within the component, such as an oscillator, clock circuitry, RAM, or the like, also will not receive power when the component is in a powered-off state. As those of skill in the art will appreciate, in some embodiments, a component may have an internal electronic switch (or an analogous component, such as a solid state relay, transistor, or the like) that may be used or instructed to connect and/or disconnect the component from electrical power. Further, as used herein, the terms "sleep" and "sleep mode," in the context of an electrical or electronic component, refers to a limited-power mode of operation of such component in which the component is not fully powered-off. Those of ordinary skill in the art are familiar with various sleep modes in computing and electronics, all of which are within the scope of the present invention. For instance, if a component is in sleep mode, power may be cut to various subsystems (hardware, software, or both) that are not necessary to maintain the component's state or unnecessary to retain its data. Likewise, unnecessary processes may be suspended when a component sleeps. However, some elements of a component in sleep mode may remain powered, or active, such as an oscillator, clock circuitry, RAM, or the like. Such elements may, in various implementations, count cycles until a "wake" interrupt is generated. Also as used herein, the term "powered-on," in the context of an electrical or electronic component, refers to a state in which the component is consuming electrical power from a power source in its normal mode of operation and is not sleeping or in sleep mode.

Figure 1:
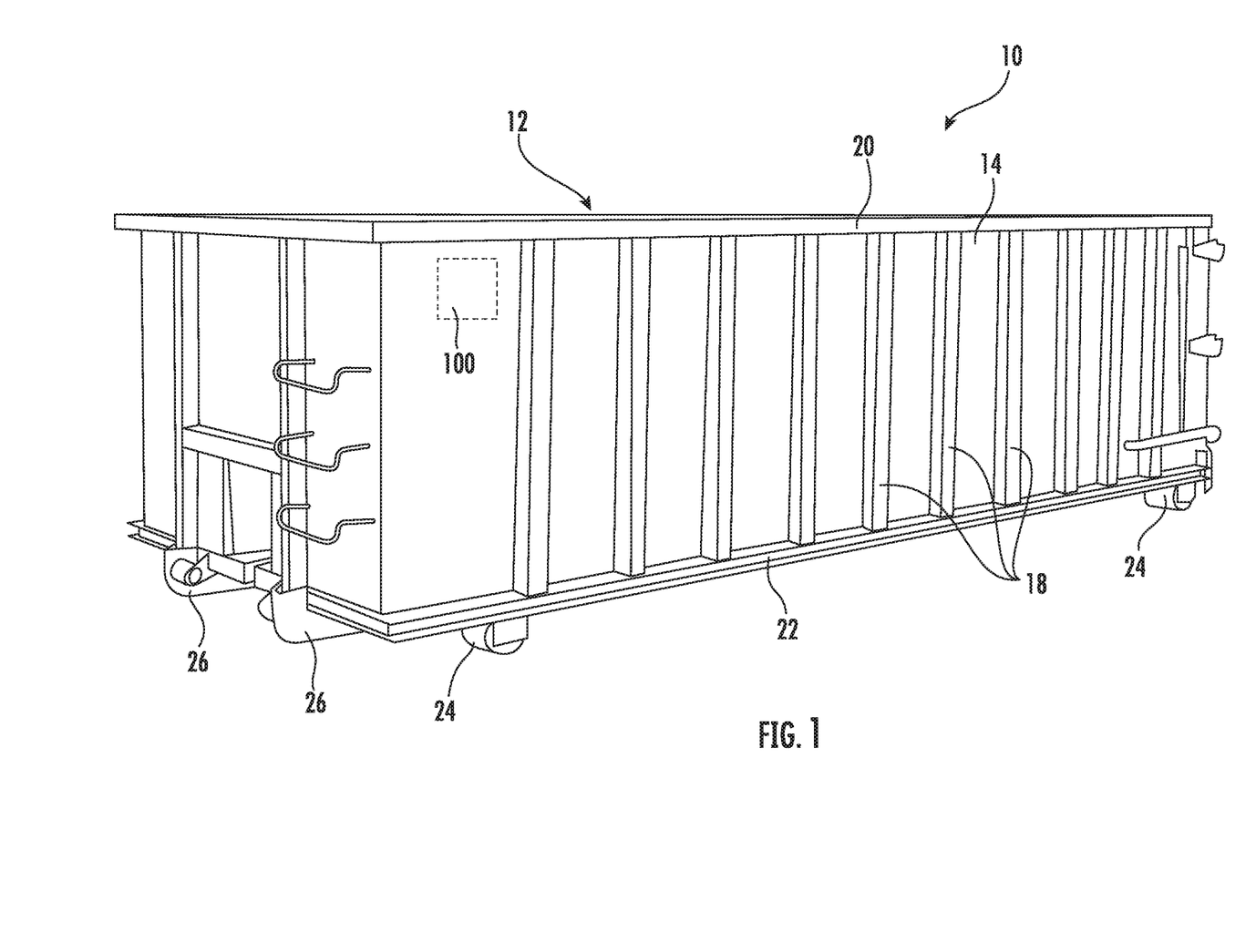
FIG. 1 is a perspective view of a container tracking assembly coupled with a roll-off container in accordance with an embodiment of the present invention.

Turning now to the figures, FIG. 1 is a perspective view of a rectangular, open top roll-off container 10 with which embodiments of the present invention may be used. Container 10 includes a body 12 including walls 14 and a door (not shown) provided on hinges at one end thereof to facilitate access to the interior volume of container 10. Container 10 is made out of a suitable metal material, such as steel. Walls 14 can be fabricated from steel, and a floor plate of container 10 (not shown) can be made from 7 gauge steel, for example. Also, walls 14 are reinforced by a plurality of vertical supports 18 which extend between a top rail 20 and a bottom sill 22 of container 10. Also, container 10 typically includes at least one set of wheels 24 to allow container 10 to be rolled in place and onto and off of a truck frame via a hoist apparatus. Container 10 also may include a pair of main rails 26 used to provide support for heavy refuse and to facilitate placement of container 10 on the truck frame.

Figure 2:
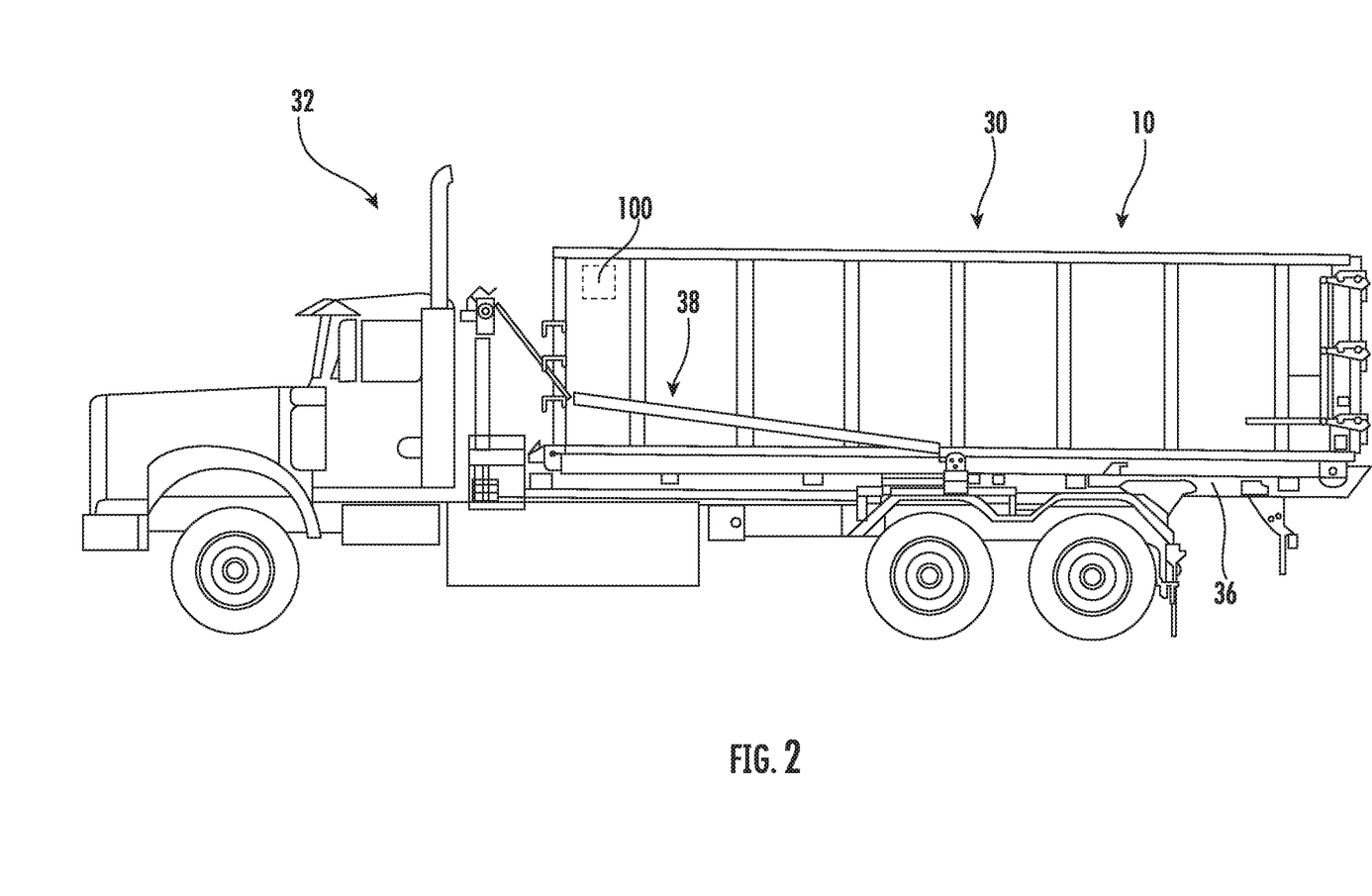
FIG. 2 is a perspective view of the container tracking assembly and roll-off container of FIG. 1 disposed on a vehicle used to load, unload, transport, and dump the roll-off container.

As shown in FIG. 2, a vehicle 30 equipped with a cable hoist has a cab 32 and is configured to support roll-off container 10 on a sub-frame of the cable hoist pivotably connected with vehicle frame 36. A covering apparatus 38 is provided to extend and retract a cover over the top of container 10, as is well understood. Vehicle 30 is used for loading, unloading, transporting, and dumping container 10. For example, the sub-frame of the cable hoist can be elevated and lowered relative to vehicle frame 36 using hydraulic cylinders, as is also well known. When the sub-frame is elevated to an inclined position, it may serve as a ramp upon which container 10 may be pulled or slid onto and off of the hoist apparatus, for instance using a cable winch system to draw container 10 upward. Container 10 may also be dumped when the sub-frame is in the inclined position. When container 10 is suitably secured on the sub-frame, the sub-frame may be lowered into the position shown in FIG. 2 for transport. Those of skill in the art will appreciate that other types of hoist apparatuses may be used to load, unload, transport, and dump roll-off container 10, such as a vehicle equipped with a hook hoist.

Figure 3A:
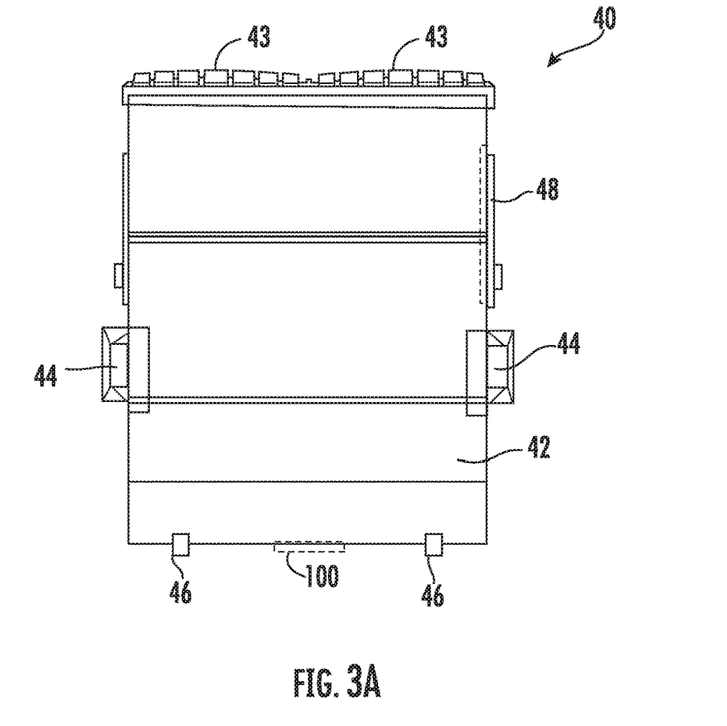
FIGS. 3A and 3B are respective front and side elevations of an FEL container provided with a container tracking assembly in accordance with an embodiment of the present invention.
Figure 3B:
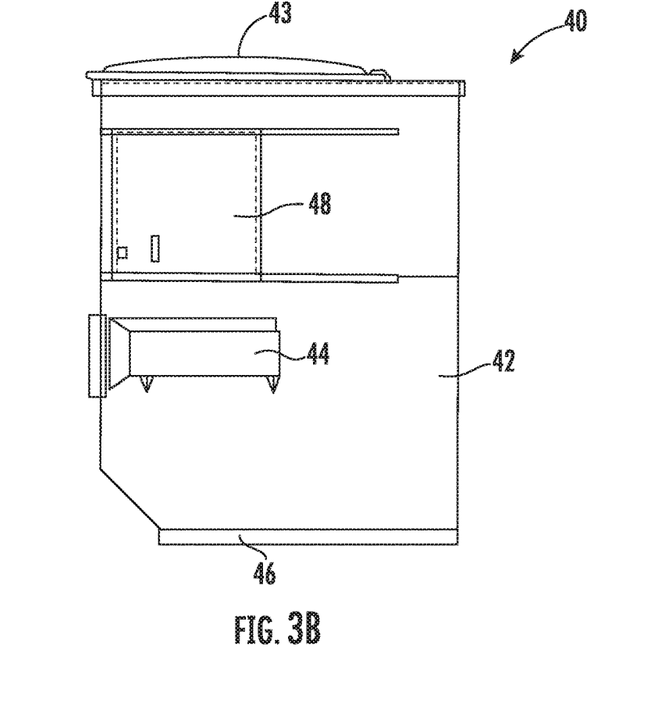

FIGS. 3A and 3B are respective front and side elevations of an FEL container 40 with which embodiments of the present invention may be used. In particular, container 40 may comprise a rectilinear body 42 defining an interior volume therein in which refuse may be stored. Body 42 may be formed of 12 gauge steel, for example. Body 42 may be open-topped, and one or more lids 43, which may be formed from a suitable plastic material, such as high-density polyethylene, may be hingedly attached to body 42 to cover the open top of body 42. Body 42 may also be provided with a pair of pockets 44, or another suitable handling structure, for receiving the tines of a container handler. Body 42 may be supported on pair of channels 46. Finally, one or more apertures may be defined in the sidewalls of body 42, and a door 48 may slidably cover such apertures. As shown in FIGS. 3A and 3B, container 40 may be analogous to the 10 cubic-yard FEL containers offered by Wastequip LLC of Charlotte, N.C.

Figure 4:
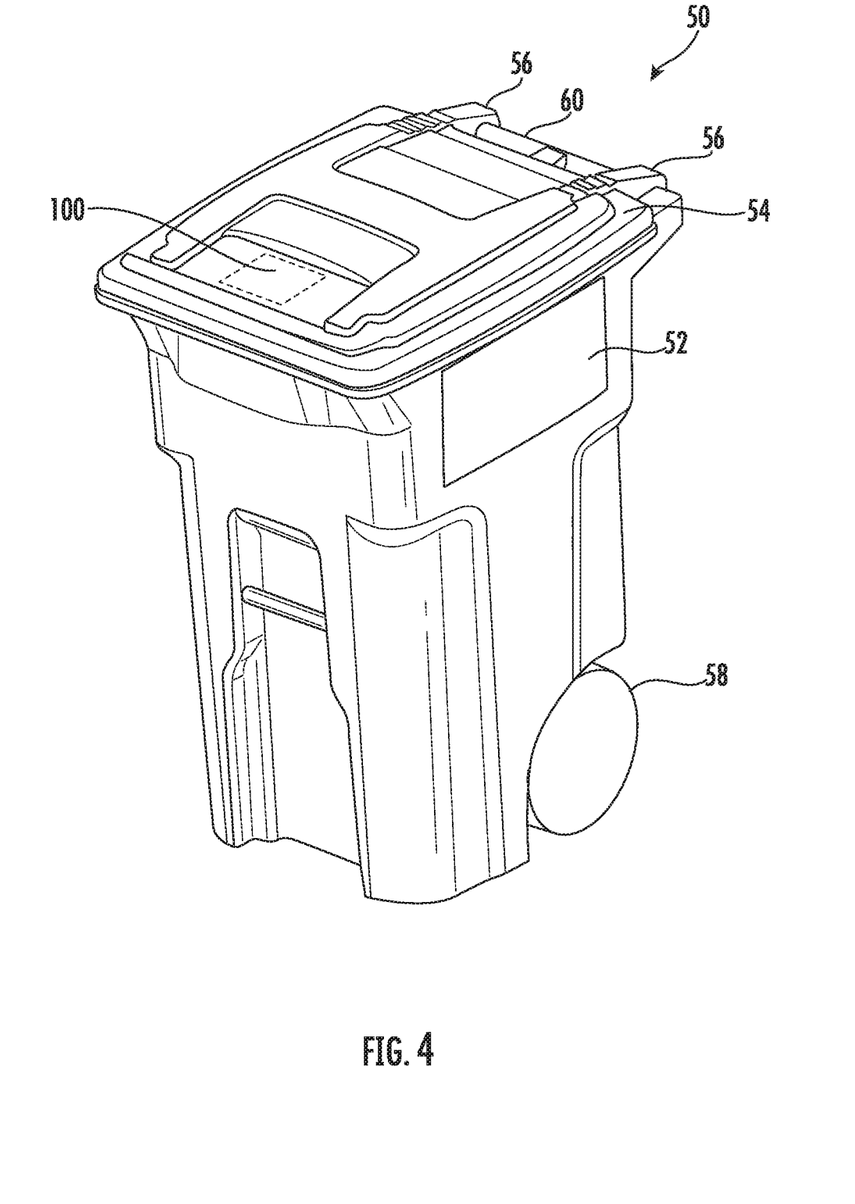
FIG. 4 is a perspective view of a container tracking assembly coupled with a "roll out" container in accordance with an embodiment of the present invention.

FIG. 4 illustrates a typical wheeled "roll out" container 50 with which embodiments of the present invention may be used. In general, container 50 includes a walled receptacle portion 52 and a lid 54, which combine to form an enclosed space. Lid 54 may be attached to receptacle portion 52 via a plurality of hinges 56. Container 50 is provided with a pair of wheels 58, one of which is shown in FIG. 4, and a handle 60. Container 50 in this embodiment has a generally four-sided polygonal shape when viewed from the top. Again, however, embodiments of the present invention are not limited to use with containers shaped like container 50. In various embodiments, a container 50 may be made from one or a combination of thermoplastic or elastomeric materials. In some embodiments, container 50 may be analogous to the rotationally-molded two-wheel carts manufactured by Toter, LLC of Charlotte, N.C.

As shown schematically in broken lines in FIGS. 1-2, 3A, and 4, a container tracking assembly 100 may be coupled with containers 10, 40, and 50. In particular, in the embodiment shown in FIGS. 1-2, container tracking assembly 100 may be coupled with a wall 14 of container 10. As shown in FIG. 3, container tracking assembly 100 may be disposed on a bottom side of body 42 of container 40, for example between channels 46. As shown in FIG. 4, container tracking assembly 100 may be coupled with lid 54 of container 50.

Although exemplary embodiments are described below in the context of the refuse containers shown in the Figures, those of skill in the art will appreciate that embodiments of the present invention are not so limited. In particular, those of skill in the art will appreciate that embodiments of the present invention may be used with other types of containers suitable for storage, collection, and transport of waste and refuse materials, including various types of residential, commercial, industrial, and institutional containers. Among others, roll-off containers, FEL containers, recycling bins, materials handling carts, tilt trucks, stationary containers, and wheeled containers all may be used with embodiments of the present invention. Further, although embodiments are shown wherein a container tracking assembly is provided on or integral with certain portions of refuse containers, it is contemplated that indicator assemblies in accordance with the present invention can be associated with any suitable portion of any suitable refuse container, both interior and exterior. Likewise, it is contemplated that a refuse container may be manufactured to include an integral container tracking assembly, or at least a housing portion thereof.

Figure 5:
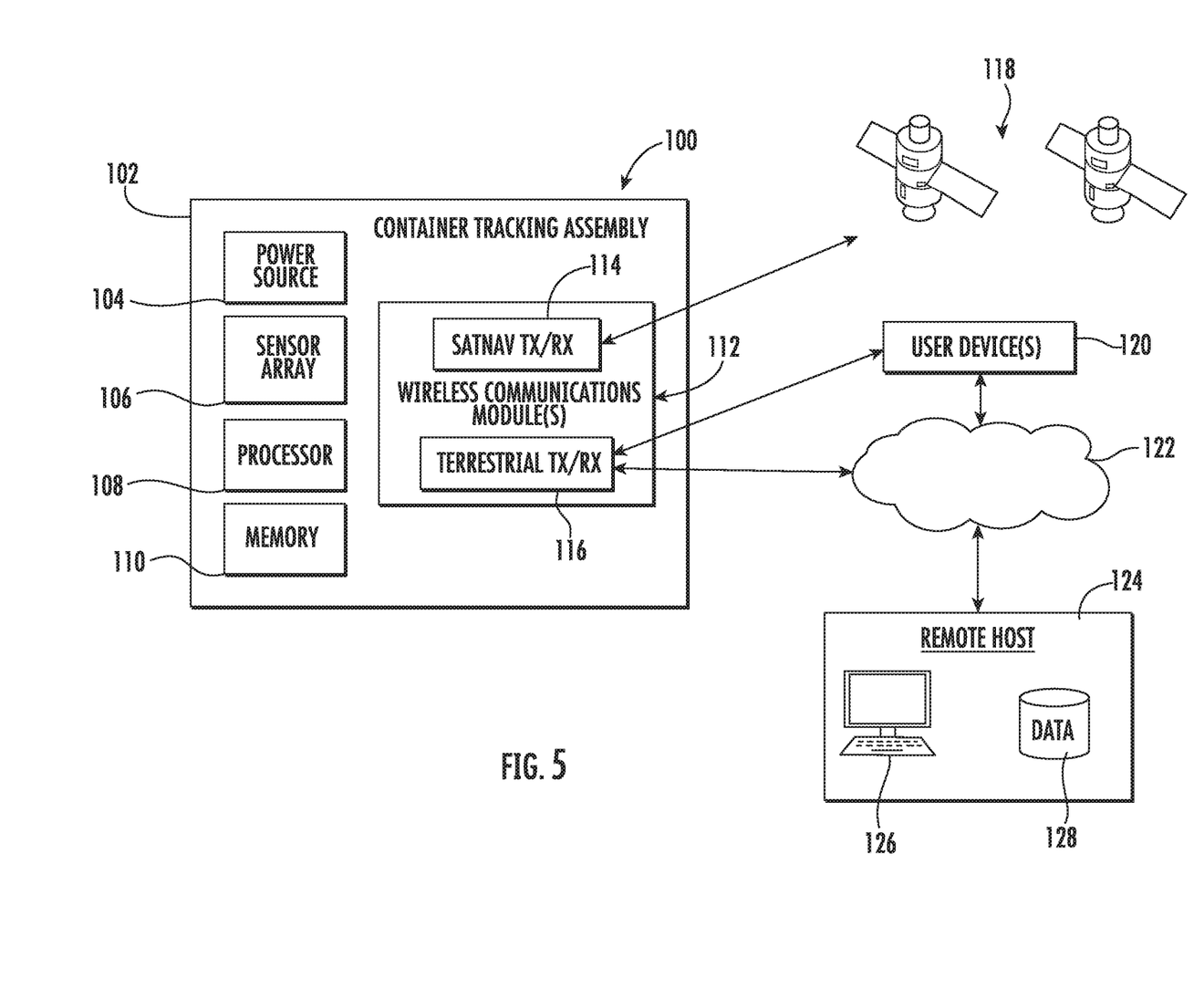
FIG. 5 is a block diagram illustrating a container tracking assembly in accordance with an embodiment of the present invention.

FIG. 5 is a block diagram illustrating container tracking assembly 100 in accordance with one embodiment of the present invention. In this regard, container tracking assembly 100 may comprise a housing 102 that forms an enclosed space for one or more sensors and container tracking electronics, though housing 102 is not required in all embodiments. Also, container tracking assembly 100 may comprise a power source 104 operative to supply electrical power to various components of container tracking assembly 100. A sensor array 106 may comprise one or more sensors and may be in electrical communication with the power source. A processor 108 may be configured to perform, in conjunction with other container tracking electronics, the functions of the container tracking assembly 100 described herein and is also in electrical communication with power source 104. A memory 110 may be in electronic communication with processor 108. Finally, container tracking assembly 100 may comprise one or more wireless communications modules 112 which may comprise a satellite navigation receiver and/or transceiver 114 and/or a terrestrial transceiver 116 in various embodiments. Additional details regarding these components are discussed below.

It is contemplated that container tracking assembly 100 in accordance with the present invention be robust against the harsh elements and rigorous operating environments to which containers, such as containers 10, 40, and 50, are typically exposed. Thus, for example, in some embodiments, housing 102 of container tracking assembly 100 may be formed from a variety of materials selected to be compatible with the intended contents and purpose and desired qualities of the container to which it is coupled. Via housing 102, container tracking assembly 100 may be coupled to container 100 using any suitable method, such as bolts, adhesives, etc., that is operative to withstand these harsh elements and rigorous operating environments and potential attempts at removal by theft.

For example, in various embodiments, the housing 102 may be made from one or a combination of thermoplastic or elastomeric materials, such as plastic. Example thermoplastic or elastomeric materials include: polyesters, Polycarbonate (PC), polypropylene (PP), polyethylene (PE), High Density Polyethylene (HDPE), Low Density Polyethylene (LDPE), Polyvinyl Chloride (PVC), polyester terphthalate, butadiene-styrene co-polymers, polyamides, ethylene-vinyl-alcohol copolymer, polyethylene napthaphthalate, thermoplastic and thermosetting resins, polybutylene terephthalate, polyoxymethylenes, polyphenylene, polyphenylene sulfides, polyphenylene oxides, polymethylmethacrylate, polyethylene-terephthalate (PET), polyvinylidenechloride, polymethylpentene-1, nylon 6, nylon 66, Polyethylene Terephthalate Modified with CHDM (PETG), and mixtures thereof. In one embodiment, housing 102 of container tracking assembly 100 is integrally formed with a portion of container 50 during manufacturing, such as by a rotational molding process or a blow molding process. In other words, the receptacle portion 52 and/or the lid 54 may define housing 102 therein in some embodiments. In various additional embodiments, the housing 102 may be made from one or a combination of metals, such as steel or aluminum. Those of skill in the art are familiar with suitable materials from which components of indicator assemblies described herein may be made, and they may select suitable materials depending, for example, on the type of container with which the indicator assembly is used and its environment, the type of indicator assembly used, and the type of refuse involved.

Power source 104 may be any suitable power source familiar to those of skill in the art, including one or more batteries, a capacitor, or other suitable power source or circuitry, that is consistent with the functions of container tracking assembly 100. In some embodiments, power source 104 may be a low discharge battery, such as a lithium or lead acid battery. As will be appreciated, the length of time power source 104 of container tracking assembly 100 may remain operational may depend, among other factors, on the frequency with which container tracking assembly 100 obtains and/or transmits location information. As described herein, embodiments of the present invention are designed reduce and/or minimize power usage so that container tracking assembly 100 may remain deployed for long periods of time.

Container tracking assembly 100 may also comprise one or more sensors operative to detect movement of a container, and in some embodiments the one or more sensors may be disposed in an array. In this regard, sensor array 106 may include one or more sensors, including tilt sensor(s), vibration sensor(s), and/or accelerometer(s), suitable for this purpose. In some embodiments, such sensors may be passive electromechanical sensors. Thus, for example, such sensors need not be connected to electrical power in order to sense movement, though they may be in some embodiments. Those of skill in the art are familiar with and can provide sensors configured or configurable to perform the functions described herein. By way of example, in various embodiments, any or all of the rolling ball sensor switches offered by C&K of Waltham, Mass.; the tilt switches offered by Comus International of Clifton, N.J.; and the non-directional vibration-induced trigger switches offered by Adafruit of New York, N.Y., or sensors analogous thereto, may be used in sensor array 106.

In various embodiments, upon actuation of one or more sensors in sensor array 106, one or more container tracking electronics components, which may have previously been fully powered-off, are powered-on and enter an active state. As those of skill in the art will appreciate, this may be accomplished many different ways within the scope of the present invention. For instance, in one embodiment, actuation of a passive sensor causes an interrupt signal to be sent to processor 108, which causes processor 108 to wake up from a powered-off state. By way of example, a passive sensor may comprise a switch that is normally open and that is closed when the sensor is actuated. In some embodiments, closing of such switch may completes an electrical circuit, at least momentarily, which may cause electrical power or an electrical pulse to be sent to an interrupt control line or to an interrupt pin of processor 108. In some embodiments, processor 108 may then initiate powering on of other container tracking electronics. (As discussed elsewhere herein, in various embodiments, processor 108 may also initiate powering down of container tracking electronics, including powering down itself) Those of skill in the art will appreciate, however, that hardware interrupts need not be used to wake up processor 108 in all embodiments.

As shown, container tracking assembly 100 may comprise a processor 108. Processor 108 preferably is configured to perform communications control, data processing, application execution, and/or other processing according to various embodiments of the present invention described herein. The processor 108 may be embodied as a circuit chip (e.g., an integrated circuit chip) configured (e.g., with hardware, software or a combination of hardware and software) to perform operations described herein. The processor 108 may be configured to control one or more functions of one or more elements of the container tracking assembly 100 through computer program instructions (e.g., software and/or firmware) stored on a memory device accessible to the processor 108 (e.g., volatile memory, non-volatile memory, and/or the like), including memory 110 and/or a memory internal to processor 108. The processor 108 may also comprise, or be in communication with, display circuitry configured to display at least a portion of a user interface which may be used, for example, to access information stored in memory 110. In one embodiment, processor 108 may be analogous to the 8-bit microcontrollers offered by Microchip Technology (formerly Amtel).

The memory 110 may be any suitable tangible or non-transitory memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable non-volatile memories, such as secure digital (SD), flash memory, memory stick, or any other medium that may be used to carry or store computer program code in the form of computer-executable programs, instructions, or data. As noted above, processor 108 may also include a portion of memory accessible only to processor 108.

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

As noted above, in some embodiments container tracking assembly 100 may include one or more wireless communications modules 112 in electronic communication with processor 108. In various embodiments, wireless communications module 112 may comprise satellite navigation transceiver 114, which may include a satellite navigation receiver or antenna operative to receive signals sent from any multiple-satellite based positioning system 118, such as GPS, GLONASS, and GALILEO, among others. In one preferred embodiment, satellite navigation transceiver 114 may be configured to receive signals from GPS satellites and/or cellular network towers, based on which container tracking assembly 100 may determine its precise location (e.g., in longitude and latitude or another location format) and transmit this information to a remote computing device.

Additionally, in some embodiments, container tracking assembly 100 may also (or alternatively) include a terrestrial transceiver 116. As described in more detail below, transceiver 116 preferably enables communication between container tracking assembly 100 and corresponding communications electronics associated with one or more of a user device 120 (e.g., a handheld reader, PC, tablet computer, and/or smartphone, or the like, which may be carried by an individual or, for instance, a refuse collection vehicle) and/or a network 122. Thereby, for example, information acquired or determined via processor 108, stored in memory 110, or acquired via transceivers 114, 116, may be transferred to a remote host 124. Remote host 124 may comprise one or more computing devices 126 and/or databases 128, which may be accessible by container owners, haulers, and municipalities, among others. Further, in some embodiments, remote host 124 and/or user device 120 may send information or instructions to transceiver 116. For example, remote host 124 and/or user device 120 could send updates to an algorithm or computer instructions stored at container tracking assembly 100. The updates could correspond to a user preference regarding configuration (e.g., if a user desired more granular location data regarding a container in motion than configured by default, or if a user does not need as much granularity and would prefer additional battery life).

In some embodiments, the transceiver 116 may be any means, such as a device or circuitry embodied in either hardware, software, or a combination of hardware and software, that is configured to receive and/or transmit data from/to any of user devices 120 and/or network 122 and/or any other device or module in communication with the processor 108. In some instances the transceiver 116 may provide secured or encrypted communication between the processor 108, user devices 120, and/or network 122. Transceiver 116 may also include, for example, an antenna (or multiple antennas) and supporting hardware and/or software for enabling communications with user devices 120 and/or network 122. In some environments, the wireless communication module(s) 112 may alternatively or additionally support wired communication. As such, for example, the wireless communication module(s) 112 may include a communication modem and/or other hardware/software for supporting communication via cable, digital subscriber line (DSL), universal serial bus (USB) or other mechanisms.

In an exemplary embodiment, the wireless communication module(s) 112 may support communication via one or more different communication protocols or methods. In one embodiment, transceiver 116 may comprise a wireless radio operative to communicate with user device 120 and/or network 122 using radio frequency signals with wavelengths in the ISM radio bands, though this is not required in all embodiments. In some embodiments, wireless communications may be implemented using a suitable short-range communications protocol, such as NFC, Bluetooth Low-Energy (also known as Bluetooth Smart), Peanut, Zigbee, Wi-Fi, radio frequency identification (RFID), or the like, though any suitable wireless communication protocol may be used with embodiments of the present invention. For instance, in some embodiments, transceiver 116 may comprise a wireless radio suitable for transmitting information to another device using 3G, 4G, or LTE standards, and in other embodiments, transceiver 116 may communicate via infrared signals. In some embodiments, transceiver 116 may also receive signals based on which container tracking assembly 100 may determine its precise location (e.g., in longitude and latitude or another location format), for instance in the case where satellite navigation transceiver 114 is not provided or is inoperative or inaccessible. In various embodiments, satellite navigation transceiver 114 and terrestrial transceiver 116 may be part of the same chip or chipset. Thus, for example, wireless communications module(s) 112 in one embodiment may comprise a low-power GPS/cellular modem chipset.

User devices 120 may be any suitable portable computing device known to those of skill in the art, such as but not limited to computer monitors, tablet computers, laptops, and cell phones. Again, a user device 120 may be in selective wired or wireless electronic communication with processor 108 via suitable communications electronics. In particular, user devices 120 may comprise a processor and memory configured to generate a graphical user interface from which a user may write to and/or read from memory 110. Also, in some embodiments, a user may use user device 120 to send commands to processor 108 and may perform other functions associated with container tracking assembly 100.

Where employed, the network 122 may be a data network, such as a local area network (LAN), a metropolitan area network (MAN), a wide area network (WAN) (e.g., the Internet), and/or the like, which may communicatively couple container tracking assembly 100 to devices such as processing elements (e.g., computer terminals, server computers or the like) and/or databases. For instance, container tracking assembly 100 may be in remote electronic communication with computing device 126 and/or database 128 via network 122, either directly or indirectly through a user device 120. As noted above, communication between the network 122, the container tracking assembly 100, and the devices or databases (e.g., servers) to which the container tracking assembly 100 is coupled may be accomplished by either wireline or wireless communication mechanisms and corresponding communication protocols.

Database 128 may be any suitable database known to those of skill in the art. Database 128 may be used to compile information associated with a plurality of container tracking assemblies 100 coupled with a plurality of containers. The database 128 may be located at any location, and it may be maintained, for example, by a waste hauler, waste generator, municipality, or the like. Thereby, the hauler, waste generator, and/or municipality may compile information regarding the locations and movement of various containers, including for example whether a container has been emptied or picked up. Additionally, as described in greater detail herein, data associated with sensor assembly 106 may also be stored in database 128, such as data on which sensor was actuated and measurements taken at such sensor. Further, the times associated with various events may also be stored in database 128. Thus, for example, a user of database 128 may verify the dates and times that containers were moved. Certain data (such as, for example, data from a tilt sensor accompanied by a small or nonexistent change in location, or change in location data showing that the container has been moved to a dumping location) may indicate that a container has been emptied. Further, users of database 128 may determine that container is moving or has been moved when no movement is expected, and thus they may take action in response to potential theft and to potentially recover the container. In some embodiments, it is contemplated that remote computing device 126 and/or database 128 may send a user or another party (e.g., personnel, police, etc.) an alert when a container is moved unexpectedly.

Figure 6:
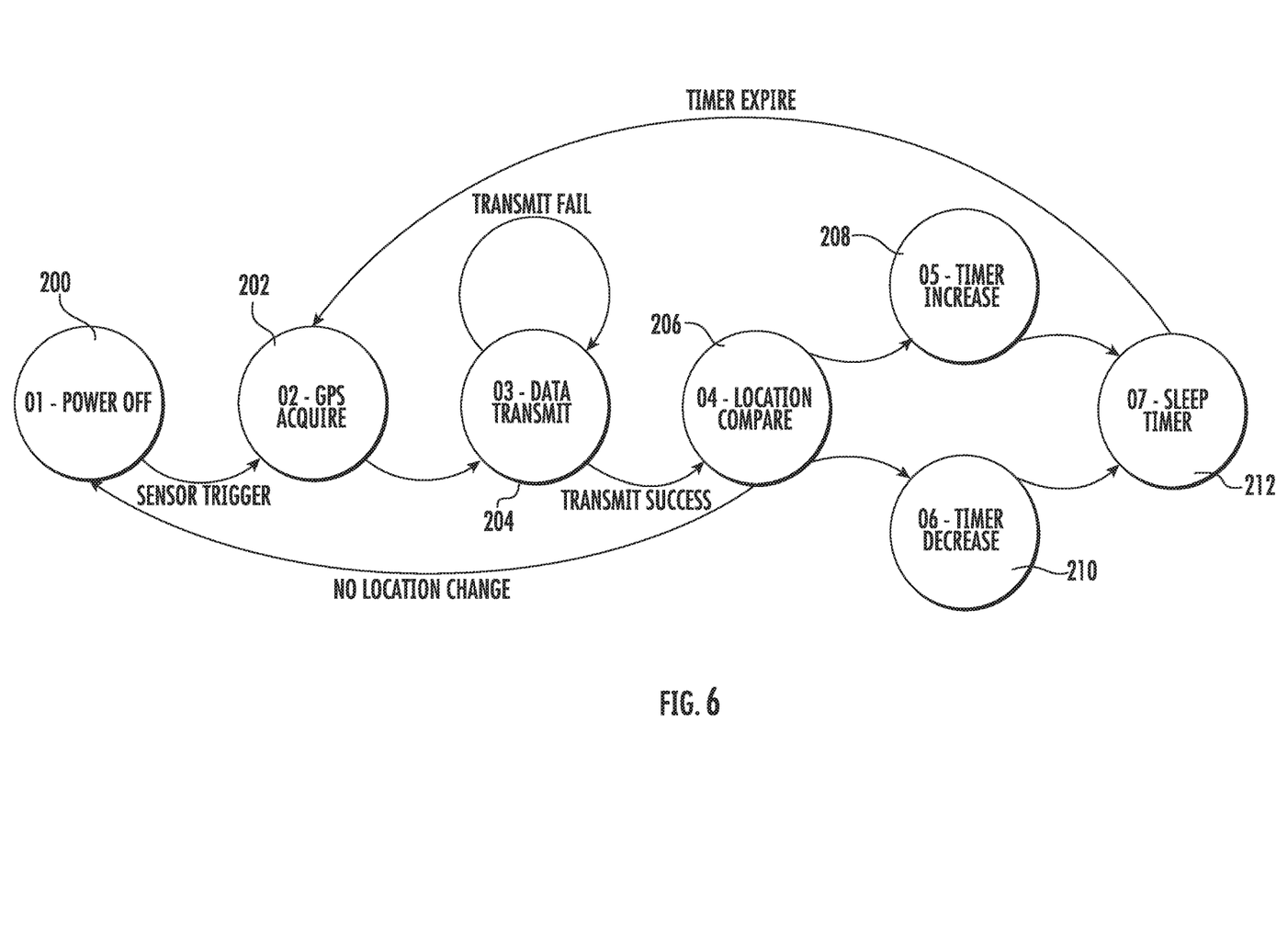
FIG. 6 is a state diagram illustrating operational states of a container tracking assembly in accordance with an embodiment of the present invention.

Certain aspects of the operation of container tracking assembly 100 are discussed with further reference to FIG. 6. FIG. 6 is a state diagram illustrating certain operational states of container tracking assembly 100 in accordance with an embodiment of the present invention. As noted above, container tracking assembly 100 may be coupled with any of containers 10, 40, 50, and/or any other suitable refuse container. At state 200, the system may be in a powered-off condition (e.g., none of sensor array 106, processor 108, memory 110, and/or wireless communication modules 112 may consume electrical power from power source 104). Upon actuation of one or more sensors in sensor array 106, for instance when the container is moved or tilted, the system may "wake up," or enter a powered-on condition (e.g., one or more of sensor array 106, processor 108, memory 110, and/or wireless communication modules 112 may consume electrical power from power source 104).

Next, at state 202, satellite navigation transceiver 114 may acquire information representative of its current location (e.g., its geographic coordinates in longitude and latitude), and thus, the location of the container. In some embodiments, satellite navigation transceiver 114 may also receive other information, including a time or timestamp associated with the location acquisition. Acquisition may occur immediately upon or shortly after the system entering an active state, or it may occur periodically at predetermined time(s).

At state 204, location and/or other data may be transmitted to a remote location, such as remote host 124, where that information may be stored in database 128 and/or accessed via remote computing device 126. Such data may also be transmitted to a user device 120 in some embodiments. The data may be transmitted, for example, via terrestrial transceiver 116. Transmission may occur immediately upon or shortly after the location information is acquired, or transmission may occur periodically at predetermined times. The transmission may also occur in response to an interrogation or request signal sent, for example, from a user device 120, or via network 122.

Among other information, the transmitted data may include the data representative of the current location of the container, a time or timestamp (e.g., a time value associated with a clock of processor 108, the current date and time of day, a timestamp received via satellite navigation transceiver 114, etc.), and/or data associated with sensor array 106, such as the specific sensor that was actuated and any values measured at such sensor. In some embodiments, the transmitted data may also include information representative of the "health" of power source 104 (e.g., its state of charge or the amount of battery life remaining). Any or all of this data may also be stored in memory 110 in addition to database 128. As shown in FIG. 6, if the transmission fails, the operation at state 204 may be repeated.

If the transmission is successful, at state 206, the current location may be compared to one or more previously-acquired location(s) of the container which may have been previously stored in memory. (In some embodiments, the operations performed at state 206 may be performed regardless of whether the transmission is successful.) In particular, in some embodiments, processor 108 may perform various operations at state 206 based on information stored in memory 110. For example, in some embodiments, as part of the comparison, it may be determined whether the container is moving and, if so, a rate at which the container is moving. For instance, memory 110 may contain records regarding a plurality of previously-acquired (and, in some cases, transmitted) locations of the container, and processor 108 may access this information to perform the comparison. In various embodiments, a container may be deemed to be moving if the current location differs from a previously-acquired location (e.g., the most recently-acquired location) by any amount. Alternatively, in some embodiments, a container may be determined to be moving if the current location differs from a previously-acquired location by an amount that exceeds a predetermined threshold.

At state 206, the processor 108 may also determine, if applicable, a distance by which the container has moved. Processor 108 may, for example be configured to calculate a distance value based on two different sets of coordinates or other information representative of geographic location. The distance value may be a linear distance or a distance as driven along a route or road. Those of skill in the art are familiar with suitable techniques for determining such a distance value based on geographic location. Further, at state 206, processor 108 may use such distance information in conjunction with time information associated with the current and one or more previously-acquired locations to determine a rate (e.g., speed) at which the container is moving. As noted above, this time information may have been received via a transmission from transceivers 114 and/or 116 and may be stored in memory 110, or it may be based on a clock of processor 108, among other things. Remote computing device 126 may also associate each location with a time (e.g., a time kept at remote computing device 126 itself) when the location information is received. In some embodiments, other attributes of the container's movement, such as acceleration, the length of time it has been moving, the last time it was moved, etc., may also be determined at state 206. All of these determined container attributes may be stored in memory at the remote host 124 (e.g., database 128), the user device 120, and/or memory 110 of container tracking assembly 100.

As shown in FIG. 6, if it is determined at state 206 that the location of the container has not changed, or has not changed more than a threshold amount, then the system may return to a powered-off condition (state 200).

Next, in various embodiments, and if it is determined that at least some change in location of the container has occurred, a sleep time may be determined. As used herein, the phrase sleep time refers to a duration or amount of time for which some or all components of container tracking assembly 100 may sleep or be in a sleep mode. The determination of the sleep time may be based on one or more factors in accordance with various embodiments of the present invention.

Figure 7:
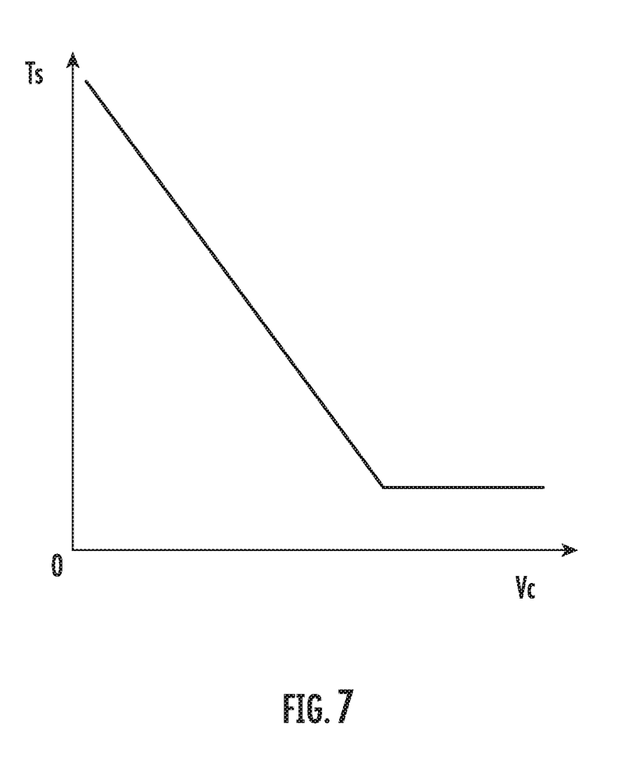
FIG. 7 is a graph illustrating a relationship between the rate of movement of a container and sleep time in accordance with an embodiment of the present invention.

In particular, such factors include, but are not limited to, the rate or speed of movement of the container (either standing alone, or as compared to the speed of the container in a previous iteration of the cycle), the time of day (e.g., the sleep time could be shorter if movement occurs at night), the amount of time for which the container has been moving, the amount of time elapsed since the container last moved, and whether movement is expected, among others. For example, in some embodiments, the determined sleep time may be proportional to the rate of movement of the container. In this regard, FIG. 7 is a graph illustrating a relationship between the rate of movement of a container ($V_C$) and sleep time ($T_S$) in accordance with one embodiment of the present invention.

Alternatively, in some embodiments, there could be predefined values of the sleep time that correspond to container speeds falling within various ranges (e.g., 0-15 mph, 16-30 mph, 31-60 mph, etc.). As a further example, the sleep time may change only by a predefined amount, up or down, and at each iteration, the sleep time may increase or decrease by this predefined amount. For instance, for each iteration in which the speed of the container has increased, the sleep time increases by the predefined amount, and for each iteration in which the speed of the container has decreased, the sleep time decreases by the predefined amount. Likewise, the sleep time could increase by a predefined amount during each iteration that the container continues to move, and the sleep time could decrease by the predefined amount during each iteration when the container is not moving. Many other possibilities will be evident to those of ordinary skill in the art and are within the scope of the present invention.

Based on the above, state 208 represents a situation in which the newly-determined value of the sleep time is greater than a previously-determined value of the sleep time, if any. This may mean that the rate at which location information regarding the container is obtained and/or transmitted to a user device 120 or remote host 124 is decreased. In other words, as the sleep time becomes longer, data regarding the container's location will be less detailed, or "granular." Similarly, state 210 represents the situation in which the newly-determined value of the sleep time is smaller than a previously determined value of the sleep time, if any. This may mean that the rate at which location information regarding the container is obtained and/or transmitted to a user device 120 or remote host 124 is increased. In other words, as the sleep time becomes shorter, data regarding the container's location will be more detailed or granular. Although not shown in FIG. 6, in any given iteration, the determined sleep time may remain the same as in the previous iteration. Similarly, in various embodiments, the sleep time may always remain the same, and no iterative determination of a sleep time value may occur.

Finally, at state 212, some or all components of container tracking assembly 100 may enter a sleep mode for the determined sleep time. In this regard, after the sleep time is determined, processor 108 may sleep for the sleep time. Additionally, various container tracking electronics components, including GPS devices, cellular modems, and WiFi chipsets, among others, have various sleep states in addition to their powered-off or powered-on states, and processor 108 may instruct such other container tracking electronics components to enter a sleep mode as well prior to causing itself to enter a sleep mode. In other embodiments, container tracking electronics other than the processor 108 may be in a powered-off state when the processor 108 is sleeping. In yet other embodiments, such as where the sleep time is determined at remote host 124, the sleep time may be transmitted from remote host 124 to container tracking assembly 100, for instance via network 122 and terrestrial transceiver 116, where it is passed to processor 108. As shown in FIG. 6, after the sleep time has elapsed or expired, another iteration may occur, beginning at state 202, described above. Iteration may continue until the location comparison described above with reference to state 206 results in a determination that the location of the container is no longer changing by a sufficient amount. At that point, the system may reenter the powered-off condition (state 200), where it may remain until a sensor associated with sensor array 106 is actuated.

With respect to the embodiment shown in FIG. 6, various functions are described above as being performed at container tracking assembly 100 (such as via processor 108 and memory 110). However, those of skill in the art will appreciate that this is not required in all embodiments. For instance, any or all such functions, including the storage of information regarding a container's locations, times, sensor data, and/or attributes related to movement of the container; the determination of whether the container is moving, the rate at which it is moving, the distance it has moved, or other attributes related to movement of the container; and the determination of a sleep time, may be performed at remote host 124 and/or at user device(s) 120. This may occur, for instance, via remote computing device 126 and database 128. Further, in some embodiments, any of these functions could be performed both locally and remotely, or they could be allocated between the container tracking assembly 100 and a remote device in a manner differently than described above.

Figure 8:
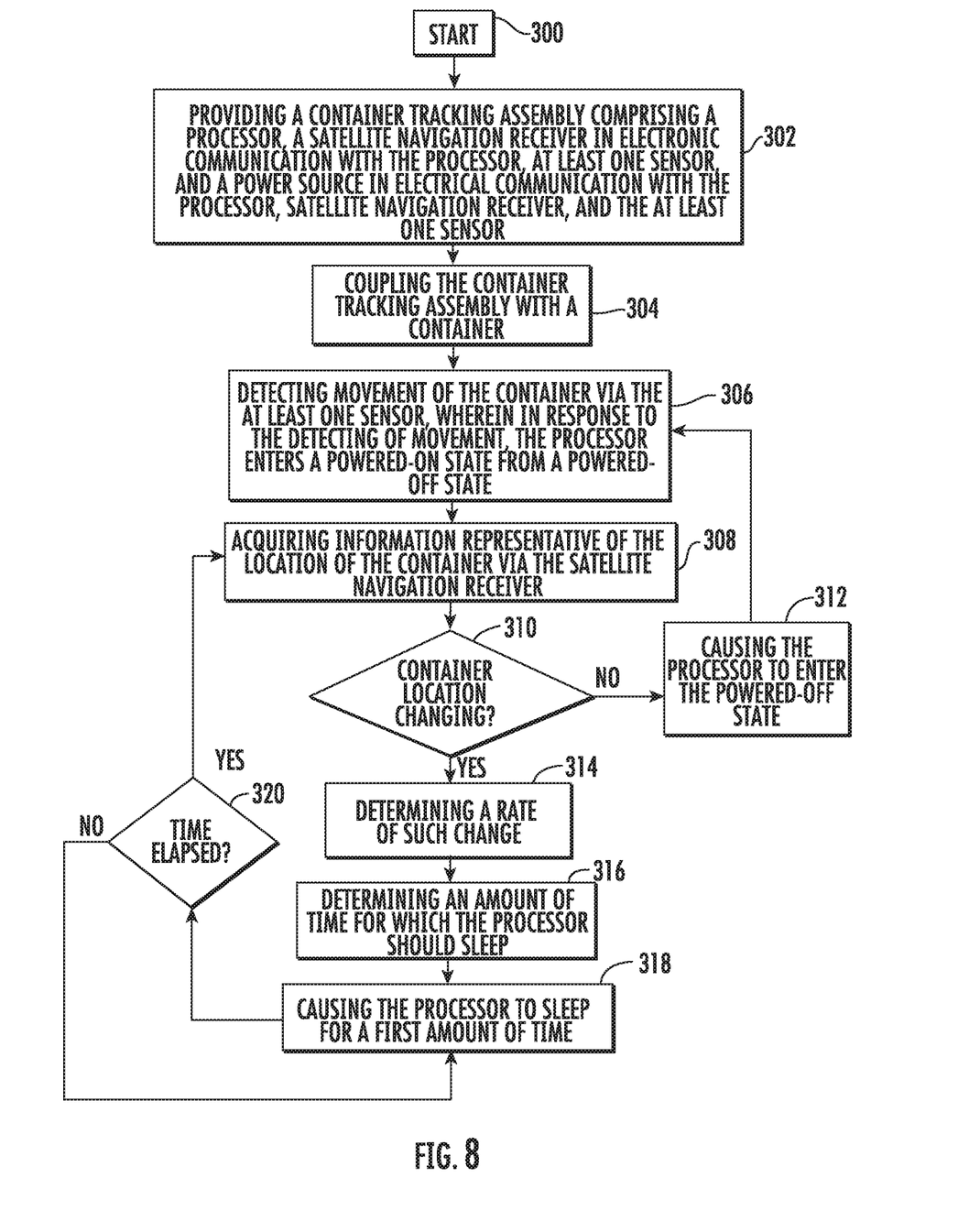
FIG. 8 is a flow chart illustrating operations of a method in accordance with an embodiment of the present invention.

Embodiments of the present invention provide methods, apparatus, and computer program products for tracking movement and/or the location of a refuse container. Various examples of operations performed in accordance with embodiments of the present invention are described herein, and one particular example will now be provided with reference to FIG. 8. In this regard, FIG. 8 is a flow diagram illustrating operations of a method of remotely tracking movement of a container in accordance with an embodiment of the present invention. The method of FIG. 8 may be performed with container tracking assemblies according to various embodiments of the present invention, and reference is made to the container tracking assembly 100 of FIG. 5 by way of example only. Additionally, as described in more detail below, various embodiments of the method of FIG. 8 do not require all operations to be performed, or to be performed in the particular order shown.

Referring now to FIG. 8, at operation 300, the method begins. At operation 302, a container tracking assembly is provided. The container tracking assembly may be analogous to container tracking assembly 100, described above, and thus it may comprise a processor, a satellite navigation receiver in electronic communication with the processor, at least one sensor, and a power source in electrical communication with the processor, satellite navigation receiver, and the at least one sensor. At operation 304, the container tracking assembly may be coupled with the container. As discussed above, the container tracking assembly may be initially powered off, and it may remain in that condition until a sensor is actuated.

At operation 306, the at least one sensor may detect movement of the container. Movement, in this context, may refer to a change in altitude, orientation, or location, or a vibration. In response to the detecting of movement, the processor enters a powered-on state from a powered-off state. Next, at operation 308, information representative of the location of the container may be acquired via the satellite navigation receiver, though as noted above, location information may also be obtained via a terrestrial transceiver.

At operation 310, a determination is made whether the location of the container is changing. As noted above, in various embodiments, this determination may occur locally at the container tracking assembly or at a remote system or user device. If the location of the container has not changed, at operation 312 the processor is caused to enter the powered-off state. If, however, the location of the container is changing, at operation 314, a rate of such change is determined. At operation 316, an amount of time for which the processor should sleep is determined. Again, these determinations may be made locally or at a remote system or user device.

At operation 318, the processor is caused to sleep for a first amount of time. At operation 320, if the first amount of time has not elapsed, the method returns to operation 318, and the processor continues to sleep until the first amount of time has elapsed. When that occurs, the method may return to operation 308. As a result, certain operations within the method may be repeated. Repetition may occur until it is determined at operation 310 that the container location is not changing (at all, or more than a threshold amount), at which point the method passes to operation 312, and the container tracking assembly enters a powered-off state. A portion of the method may resume again at operation 306 when movement of the container is detected again via the at least one sensor.

Based on the foregoing, it will be appreciated that embodiments of the invention provide new and unique systems and methods for conveying and collecting information regarding the location and movement of various types of refuse containers. In various embodiments, a container tracking system may be designed to reduce and/or minimize power usage so that it can stay deployed for long periods of time while also giving detailed tracking information as the container is moved. In other words, unlike the possibility of merely predefining a periodic sleep time (e.g., once/day) and that otherwise continuously transmits location information without ever fully powering down, embodiments of the present invention may balance more fine-grained location updates when needed with greater battery conservation when location updates are unnecessary (such as when the container is not moving).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A container tracking assembly for attachment to a container in order to track the location thereof, the container tracking assembly comprising:
   a processor, the processor having a powered-off state and a sleep state;
   at least one sensor in electronic communication with the processor;
   a radio frequency transceiver in electronic communication with the processor;
   a power source in electrical communication with the processor, the at least one sensor, and the radio frequency transceiver; and
   a non-transitory memory having instructions stored thereon, wherein the instructions, when executed by the processor, are operative to:
   i. acquire, via the radio frequency transceiver, a current location of the container;
   ii. cause the processor to enter the powered-off state if the current location of the container does not differ from a previously-acquired location of the container by more than a threshold distance; and
   iii. if the current location of the container differs from the previously-acquired location of the container by more than the threshold distance, cause the processor to enter the sleep state for a first period of time.

2. The container tracking assembly of claim 1, wherein the instructions are further configured, when executed by the processor, to repeat operations i. through iii. after the period of time has elapsed.

3. The container tracking assembly of claim 1, wherein actuation of the at least one sensor causes the processor to enter a powered-on state.

4. The container tracking assembly of claim 1, wherein the at least one sensor is selected from the group consisting of a tilt sensor and a vibration sensor.

5. The container tracking assembly of claim 1, wherein the instructions are further configured, when executed by the processor, to compare the current location of the container with the previously-acquired location of the container.

6. The container tracking assembly of claim 5, wherein the previously-acquired location of the container is stored in a memory of the container tracking assembly.

7. The container tracking assembly of claim 5, wherein the instructions are further configured, when executed by the processor, to determine the first period of time.

8. The container tracking assembly of claim 1, wherein the instructions are further configured, when executed by the processor, to transmit the current location of the container to a remote computer.

9. The container tracking assembly of claim 8, wherein the remote computer is configured to compare the current location of the container with the previously-acquired location of the container.

10. The container tracking assembly of claim 9, wherein the previously-acquired location of the container is stored in memory at the remote computer.

11. The container tracking assembly of claim 10, wherein the remote computer is configured to determine a rate at which the location of the container is changing.

12. The container tracking assembly of claim 11, wherein the remote computer is configured to determine the first period of time.

13. The container tracking assembly of claim 12, wherein the determination of the first period of time is based on a distance by which the location of the container has changed.

14. A method of remotely tracking movement of a container, the method comprising:
   a. providing a container tracking assembly, the container tracking assembly comprising:
      a processor;
      a satellite navigation receiver in electronic communication with the processor;
      at least one sensor; and
      a power source in electrical communication with the processor, the satellite navigation receiver, and the at least one sensor;
   b. coupling the container tracking assembly with the container;
   c. detecting movement of the container via the at least one sensor, wherein in response to the detecting of the movement, the processor enters a powered-on state from a powered-off state;
   d. acquiring information representative of the location of the container via the satellite navigation receiver;
   e. determining whether the location of the container is changing;
   f. if the location of the container is changing, causing the processor to sleep for a first amount of time; and
   g. if the location of the container has not changed, causing the processor to enter the powered-off state.

15. The method of claim 14, further comprising: after the first amount of time has elapsed, repeating operations d. through g.

16. The method of claim 14, wherein the container tracking assembly further comprises a memory, the memory having stored therein the information representative of at least one previously-acquired container location.

17. The method of claim 16, further comprising comparing the information representative of the location of the container with the information representative of the at least one previously-acquired location of the container.

18. The method of claim 14, further comprising, if the location of the container is changing, determining a rate of change.

19. The method of claim 18, wherein the first amount of time is proportional to the rate of change.

20. A method of remotely tracking movement of a container, the method comprising:
   providing container tracking electronics, the container tracking electronics including a processor in electronic communication with a satellite navigation receiver;
   coupling the container tracking electronics with the container;
   acquiring information representative of a location of the container via the container tracking electronics;
   determining whether the location of the container is changing and, if so, a rate of the change;
   if the location of the container is changing, calculating a sleep time and causing the processor to sleep for the sleep time, wherein the sleep time is based on the rate of the change;
   if the location of the container has not changed, causing the container tracking electronics to enter a powered-off state.

21. The method of claim 20, further comprising coupling a passive electromechanical sensor with the container, wherein the passive electromechanical sensor is in electrical communication with the container tracking electronics.

22. The method of claim 21, wherein, upon actuation of the passive electromechanical sensor, the container tracking electronics enter a powered-on state.

* * * * *